United States Patent

[11] 3,626,088

[72] Inventor Hans-Dieter Schneider
Gross-Gerau am Bruckelchen, Germany

[21] Appl. No. 840,673

[22] Filed July 10, 1969

[45] Patented Dec. 7, 1971

[73] Assignee Fernseh GmbH
Darmstadt, Germany

[32] Priority July 11, 1968

[33] Germany

[31] P 17 62 576.2

[54] REGULATING ARRANGEMENT FOR COLOR CAMERAS
12 Claims, 3 Drawing Figs.

[52] U.S. Cl. .......................................................... 178/5.4 R

[51] Int. Cl. .......................................................... H04m 9/04

[50] Field of Search ............................................ 178/5.2 A, 5.4

[56] References Cited

UNITED STATES PATENTS 3,029,691 4/1962 Goddard et al. .............. 178/5.2

*Primary Examiner*—Robert L. Griffin
*Assistant Examiner*—Donald E. Stout
*Attorney*—Michael S. Striker

ABSTRACT: A regulating arrangement for use in color cameras in which the individual chrominance channels are provided with amplifiers. Photoelectric cells emit signals as a function of the color temperature of the light impinging upon the cells. The amplification balance of the chrominance channels is adjusted as a function of the signals provided by the photoelectric cells, so that the amplifiers in the individual chrominance channels are adapted to the color temperature of the prevailing lighting conditions.

Inventor:
Hans-Dieter Schneider
by Michael S. Striker
Attorney

REGULATING ARRANGEMENT FOR COLOR CAMERAS

BACKGROUND OF THE INVENTION

The present invention relates, in general, to color television cameras and, in particular, to an arrangement for color cameras in which the effects from fluctuations in the color temperature, upon the reproduced picture, are compensated. This compensating arrangement includes a color temperature measuring instrument such as a sensor, as well as circuits for affecting the transmission properties of the camera as a function of the measured parameters of the sensor.

In carrying our color television activities, it occurs relatively often that the camera operator must take color television pictures under illuminating conditions which do not correspond to the normal type of illumination prevailing in a studio. The prescribed temperature for studio illumination is of the order of 2,850° K. Outdoors the equivalent temperature can be within the range of 1,000° to a maximum of 50,000° K. depending upon the prevailing clouds and the time of day. In this case, white objects and white surfaces of the picture acquire a color tint which has a disturbing effect upon the viewer of the picture. This color tint must be also, for example, be compensated through adjustment of the amplifying balance of the color amplifiers. When the illumination changes or varies rapidly as, for example, through rapidly forming and breaking cloud covers, manual compensation for the tint effect is not possible.

In accordance with the present invention, the arrangement for matching the color camera to the color temperature of the prevailing light intensity at the scene, is achieved by providing that the photocells of the illuminating source have color sensitivities corresponding to those of the chrominance channels of the camera. Furthermore, setting parameters are derived from the photoelectric cells, so that the magnitude of amplification in the chrominance channels is automatically influenced.

It is of advantage to apply each chrominance channel to a photocell which receives the illumination through a color divider or color splitter with similar transmission characteristics as that of the color camera. Two photoelectric cells may, however, be sufficient. In this case, the maximum sensitivity of one cell lies in the red spectral region of the transmission curve of the color divider or splitter of the camera, whereas the other photoelectric cell lies in the blue spectral region.

The photoelectric cells may then be connected to each other so that they are of opposite polarity. In this manner, the amplification in the blue channel or red channel is varied depending upon which polarity is an overbalancing factor. Thus, the setting of the white point can be achieved with the aid of a potentiometer or also through an aperture or diaphragm arranged in front of the photoelectric cells. Such diaphragms may also have screens and filters associated with them.

The arranging of the sensors with the photocells may be accomplished in numerous ways. It may be of advantage to arrange the sensor on the camera. In this case, its openings are directed upward. In some cases it is also desirable that the sensor be remotely located from the camera, and to be located within the scene being picked up. The measured values or parameters are then transmitted to the camera, by way of cables or wireless (radio) transmission. In other cases it may also be useful to apply a plurality of sensors, as for example in theater performances. Under these conditions, the proper sensor can be connected to the camera through selector switches, for different illuminating scenes. Finally, it may also be desirable to provide a white value indicator in conjunction with the sensors. Compensation of the measured values from the sensors can, under these conditions, be accomplished through a linear circuit, in simple cases. Through the use of a logarithmic circuit, however, more precise results may be obtained. When resorting to the latter arrangement, the luminance components of the signals may be suppressed by taking the difference of the logarithmic values. With the use of a logarithmic arrangement, furthermore, only a signal dependent upon the deviation from a white value is applied to the amplifiers.

SUMMARY OF THE INVENTION

A regulating arrangement for use in conjunction with color cameras in which the individual chrominance channels are provided with amplifiers. Photoelectric cells are exposed to the prevailing lighting conditions and provide signals as a function of the color temperature of the prevailing light. The amplification balance of the chrominance channels is affected as a function of the signals transmitted by the photoelectric cells. The arrangement is such that the amplifiers in the individual chrominance channels are adapted to the color temperature of the prevailing lighting conditions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
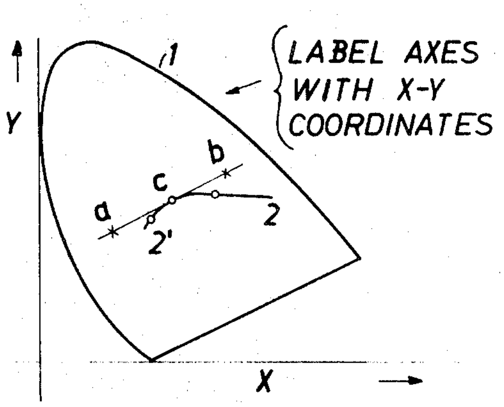
FIG. 1 is a graphical representation of the color triangle with a color temperature curve.

Referring to the drawing and particularly to FIG. 1, the curve 1 shows the color diagram in XY coordinates. The curve 2 shows the color position of black bodies of different temperature. The point 2 corresponds to infinite temperature. The points *a* and *b* are the color positions of two photoelectric cells. The line connecting these two positions *a* and *b* forms a tangent to the curve 2 at the point *c* which corresponds to the normallized or standardized color temperature. When the illuminating source is located at the point or position *c*, the signals from the photoelectric cells *a* and *b*, cancel each other. If, on the other hand, the color value is shifted in the direction 2' (towards blue) or shifted in the direction 2 (towards red), then either the photocell *a* or the photocell *b* has a preferred amount of impinging light.

Figure 2:
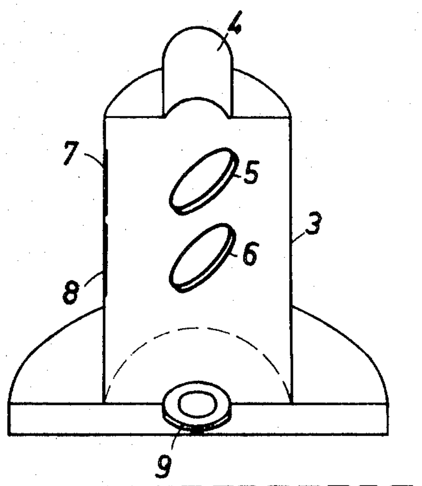
FIG. 2 is an isometric view of a cross section of a sensor used in conjunction with the regulating arrangement of the present invention.

FIG. 2 shows a cross section of a sensor with three photocells. This sensor consists of a housing 3 with a diaphragm opening or aperture 4 directed upward. The aperture 4 may be manually or automatically regulatable to compensate for changes in intensity of the prevailing light. The sensor also includes a beam splitting system made of interference deflectors 5 and 6, as well as the photocells 7, 8 and 9. The color characteristics of the beam splitter or beam divider 5 and 6, is preferably the same as the beam splitter in the color television camera. In this manner, substantially identical signals are produced when the sensitivity of the photocells 7, 8 and 9, is equal to the sensitivity of the television pickup tubes. Each of the signals from the photoelectric cells can thus be applied to either one of the amplifiers of the chrominance channels, or the photoelectric cell signal can be further processed in an auxiliary circuit.

Figure 3:
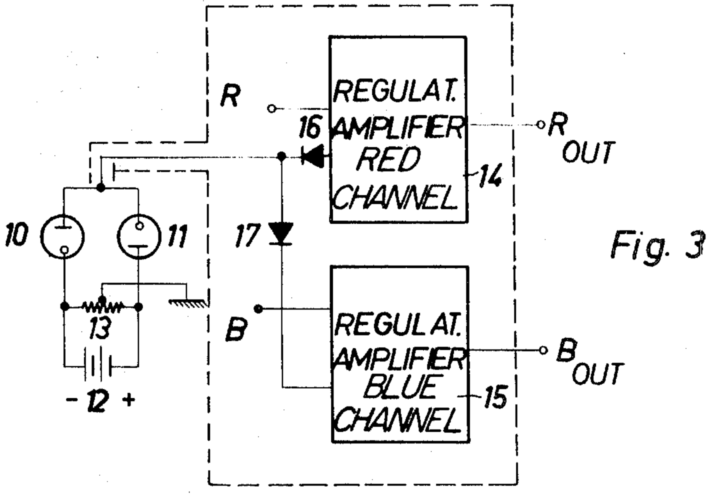
FIG. 3 is a functional schematic diagram of a circuit for utilizing and processing the signals from the sensor of FIG. 2.

FIG. 3 shows a simple schematic for the use of two photocells in a circuit in which the two cells are connected in an opposite manner to a voltage supply. Thus, the polarity associated with the connection of the photoelectric cell 10 to the battery 12, is reversed with respect to the polarity of the photoelectric cell 11 in its connection to the battery 12. The photoelectric cells 10 and 11 for the blue and red channels, are connected substantially in series with respect to the battery 12. A potentiometer 13 has its winding connected across the battery 12, and has its tap or movable contact output connected to ground potential. The potentiometer 13 forms one branch of a bridge, whereas the other branch of the bridge is formed by the photoelectric cells. The setting of potentiometer 13 may be used to compensate for differences in the sensitivity of photocells 10 and 12 or to shift the color reproduction in either direction for artistic purposes. The positive or negative signal appearing at the junction of the photoelectric cells 10 and 11, reaches either the regulating amplifier 14 or the regulating amplifier 15. These two amplifiers are associated with the red and blue channels, respectively. Diodes 16 and 17 are connected to the regulating amplifiers 14 and 15, respectively, and to the junction of the photoelectric cells 10 and 11. These two diodes 16 and 17 are connected to these regulating amplifiers, so that the diodes are oppositely directed and will transmit currents of opposite polarity to these amplifiers. Thus, the current transmitted by diode 16 to the amplifier 14 is opposite in polarity to the current transmitted by the diode 17 to the amplifier 15. Accordingly, a positive regulating signal will be transmitted to only one of the two amplifiers, whereas a negative signal will be transmitted to the other or remaining amplifier. The circuit is arranged so that a bridge network is formed by the photoelectric cells 10 and 11 for the blue and red channels respectively, and the two portions of the winding of the potentiometer 13 on opposite sides of the tap or movable contact of the potentiometer. In this arrangement, the battery 12 is connected across one diagonal of the bridge circuit. The circuit is adjusted by varying the position of the tap or movable contact of the potentiometer 13. A positive or negative signal is produced at the junction of the photoelectric cells 10 and 11, depending on the color temperature of the source at which the photoelectric cells 10 and 11 are directed. The resulting positive or negative signals from the junction of the photoelectric cells are then transmitted to one or the other of the regulating amplifiers 14 and 15. Visual outputs from these signals may be furnished by an indicator, thereby permitting corresponding adjustment of the prevailing light when control over such prevailing light is available.

The terminals designated $R_{in}$ and $B_{in}$ are the control inputs of the amplifiers 14 and 15. The chrominance signals of the red and blue channels of the image-forming tubes are applied to these control inputs of the amplifiers 14 and 15, respectively. Thus, the control inputs have the chrominance signals of the red and blue channels of the picture pickup tubes applied to them. Regulated signal outputs appear at the terminals designated $R_{out}$ and $B_{out}$, which are the output terminals of the regulating amplifiers 14 and 15, respectively. The regulated signals at these output terminals of the regulating amplifiers are substantially independent of fluctuations of the color temperature.

It will be understood that each of the elements described above, or two or more together, may also find a useful application in other types of regulating arrangements for color television cameras differing from the types described above.

While the invention has been illustrated and described as embodied in a regulating arrangement for color television cameras, it is not intended to be limited to the details shown, since various modifications and structural changes may be made without departing in any way from the spirit of the present invention.

What is claimed as new and desired to be protected by Letters Patent is set forth in the following claims:

1. A regulating arrangement for a color camera having a plurality of chrominance channels, comprising, in combination, amplifying means in said chrominance channels; photosensitive means providing signals as a function of the color temperature of the prevailing lighting; and means for varying the amplification of said amplifying means as a function of said signals, in such a manner that the amplification of said amplifying means corresponds to said color temperature of said prevailing lighting.

2. The regulating arrangement for a color camera as defined in claim 1, wherein said color camera comprises beam splitting means having a determined transmission characteristic; further comprising additional beam splitting means having transmission characteristics similar to said transmission characteristics of said beam splitting means of said color camera, each of said additional beam splitting means furnishing light to said photosensitive means.

3. The regulating arrangement for a color camera as defined in claim 1 wherein said photosensitive means comprises two photoelectric cells for picking up the prevailing lighted scene, the maximum spectral sensitivity of one photoelectric cell being in the red spectral region and the other photoelectric cell having a maximum spectral sensitivity in the blue spectral region of the transmission cure of said beam splitting means of said camera.

4. The regulating arrangement for a color camera as defined in claim 3 wherein the signal from the red sensitive photoelectric cell is of opposite polarity to the signal from the blue-sensitive photoelectric cell, the control signal for said amplifying means being the sum of the two signals from said photoelectric cells.

5. The regulating arrangement for a color camera as defined in claim 1 including light modifying means in front of said photosensitive means and regulatable manually for adapting to the prevailing light intensity.

6. The regulating arrangement for a color camera as defined in claim 1 including light modifying means in front of said photosensitive means and being automatically regulatable for adapting to the prevailing light intensity.

7. The regulating arrangement for a color camera as defined in claim 1 including a regulatable diaphragm in front of said photosensitive means for attenuating light and adapting to the prevailing light intensity.

8. The regulating arrangement for a color camera as defined in claim 1 including means for mounting said regulating arrangement as part of said camera.

9. The regulating arrangement for a color camera as defined in claim 1 including cable means for connecting said regulating arrangement to said camera, said regulating arrangement being means independent of said camera.

10. The regulating arrangement for a color camera as defined in claim 1 including a source of electrical energy for said regulating arrangement and separate from said camera, and wireless transmission means for connecting said regulating arrangement to said camera.

11. The regulating arrangement for a color camera as defined in claim 1 including switching means for selectively applying the outputs from a plurality of said regulating arrangements to said camera.

12. The regulating arrangement for a color camera as defined in claim 1 including indicating means connected to the output of said regulating arrangement for providing an indication representative of the output signal of said regulating arrangement.

* * * * *